(12) United States Patent
Smets et al.

(10) Patent No.: US 7,150,598 B2
(45) Date of Patent: Dec. 19, 2006

(54) PALLET HANDLING APPARATUS AND METHOD

(76) Inventors: John S. Smets, 11709 S. Salmonberry Dr., Oregon City, OR (US) 97045; Robert D. Smets, 26990 SW. 45th Dr., Wilsonville, OR (US) 97070

( * ) Notice: Subject to any disclaimer, the term of this patent is extended or adjusted under 35 U.S.C. 154(b) by 125 days.

(21) Appl. No.: 10/321,266

(22) Filed: Dec. 16, 2002

(65) Prior Publication Data
US 2003/0210978 A1 Nov. 13, 2003

Related U.S. Application Data

(60) Provisional application No. 60/379,348, filed on May 10, 2002.

(51) Int. Cl.
*B65G 7/08* (2006.01)

(52) U.S. Cl. .................. 414/778; 414/754; 414/758; 414/798.9; 198/468.9; 198/468.11

(58) Field of Classification Search ............ 414/798.9, 414/778, 754, 798.5, 759, 758; 198/468.9, 198/468.11
See application file for complete search history.

(56) References Cited

U.S. PATENT DOCUMENTS

| | | | |
|---|---|---|---|
| 3,232,410 A | 2/1966 | Teago | |
| 3,521,763 A | 7/1970 | Heide et al. | |
| 3,753,505 A * | 8/1973 | Ouska | 414/778 |
| 3,974,921 A | 8/1976 | Tokuno | |
| 4,037,734 A | 7/1977 | Erdman | |
| 4,103,786 A | 8/1978 | Tokuno | |
| 4,242,029 A | 12/1980 | Musgrave | |
| 4,249,847 A | 2/1981 | Tokuno | |
| 4,462,746 A | 7/1984 | Smets | |
| 4,492,016 A | 1/1985 | Smets et al. | |
| 4,838,748 A | 6/1989 | Johnson | |
| 4,919,589 A | 4/1990 | Krappitz et al. | |
| 4,983,098 A | 1/1991 | Heisler | |

(Continued)

FOREIGN PATENT DOCUMENTS

CA          998704        10/1976

(Continued)

OTHER PUBLICATIONS

Smetco, Inc. sales brochure, entitled "Smetco Systems for Pallet Repair & Sorting," 4 pages, published prior to Dec. 2001.

(Continued)

Primary Examiner—Eileen D. Lillis
Assistant Examiner—Michael Lowe
(74) Attorney, Agent, or Firm—Klarquist Sparkman, LLP

(57) ABSTRACT

Apparatus and methods for handling pallets, such as for inspection and sorting, are disclosed. In a disclosed embodiment, an up-ender includes a support frame, a pallet-tilting mechanism coupled in a pivotal manner to the frame, and first and second generally upright pusher arms coupled to the frame. The pallet-tilting mechanism is pivotable between an up position and a down position, such that when the pallet-tilting mechanism is in the up position, an upright stack of pallets can be loaded onto the pallet-tilting mechanism and when pivoted to the down position, the stack is rotated about 90° so that the pallets become generally vertically oriented. The pallet-tilting mechanism also is adapted to displace the stack of vertically oriented pallets along a support surface. The pusher arms are positioned to receive the stack of pallets from the pallet-tilting mechanism and automatically index the pallets in the stack along the support surface.

7 Claims, 4 Drawing Sheets

U.S. PATENT DOCUMENTS

| | | |
|---|---|---|
| 5,795,126 A | 8/1998 | Newnes |
| 5,879,129 A | 3/1999 | Newnes et al. |
| 6,050,771 A | 4/2000 | Dykstra |
| 6,079,939 A | 6/2000 | Smets ................... 414/798.5 |
| 2003/0059290 A1 | 3/2003 | de Jong |

FOREIGN PATENT DOCUMENTS

| | | |
|---|---|---|
| DE | 3534209 | 3/1987 |
| GB | 2 223 004 A | 3/1990 |

OTHER PUBLICATIONS

Examination Report for corresponding European Application No. 03750099.8 from the European Patent Office.

Supplemental European Search Report for corresponding European Application No. 03750099.8 from the European Patent Office.

International Search Report for corresponding International Application No. PCT/US03/14493 from the U.S. Patent Office.

* cited by examiner

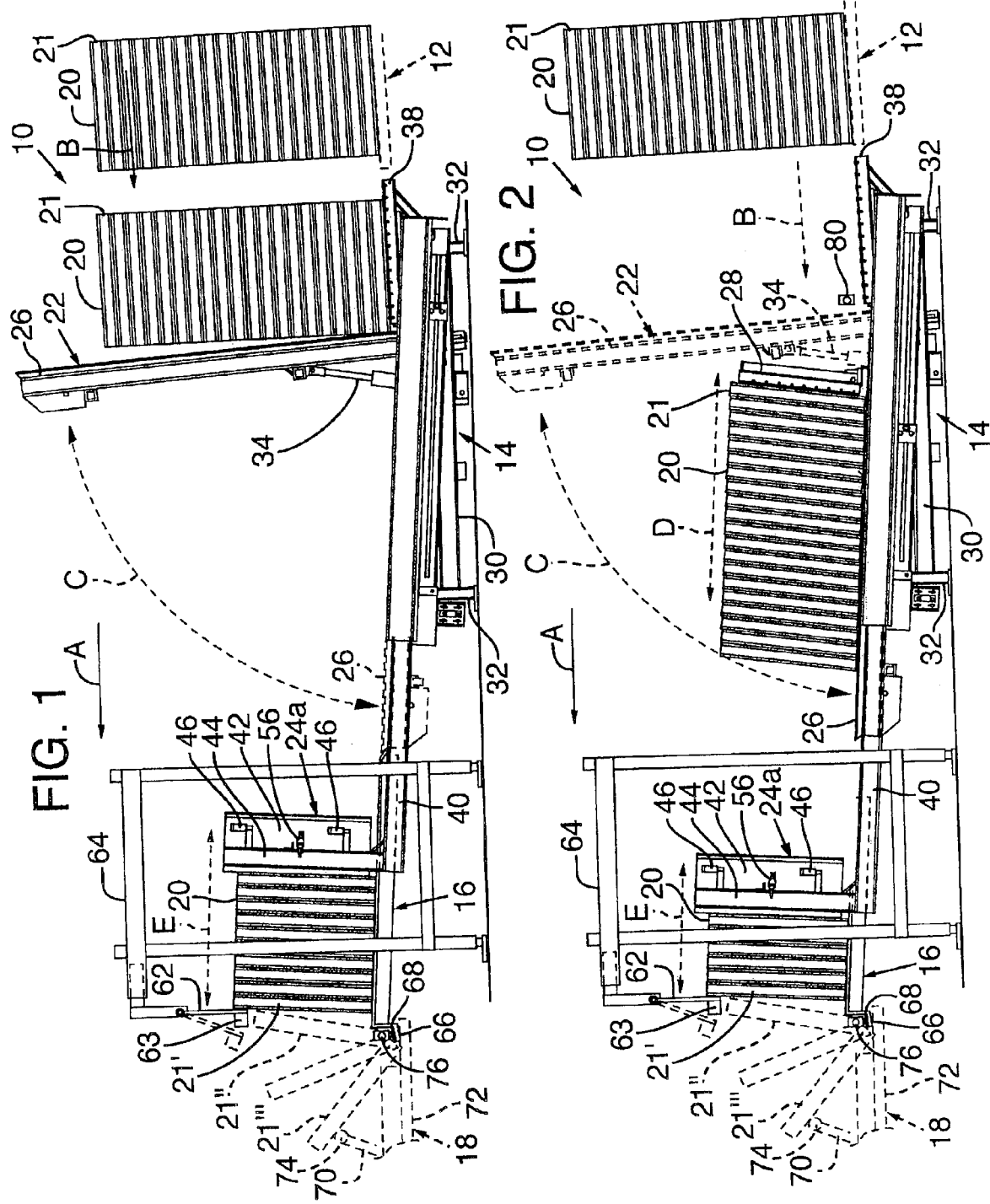

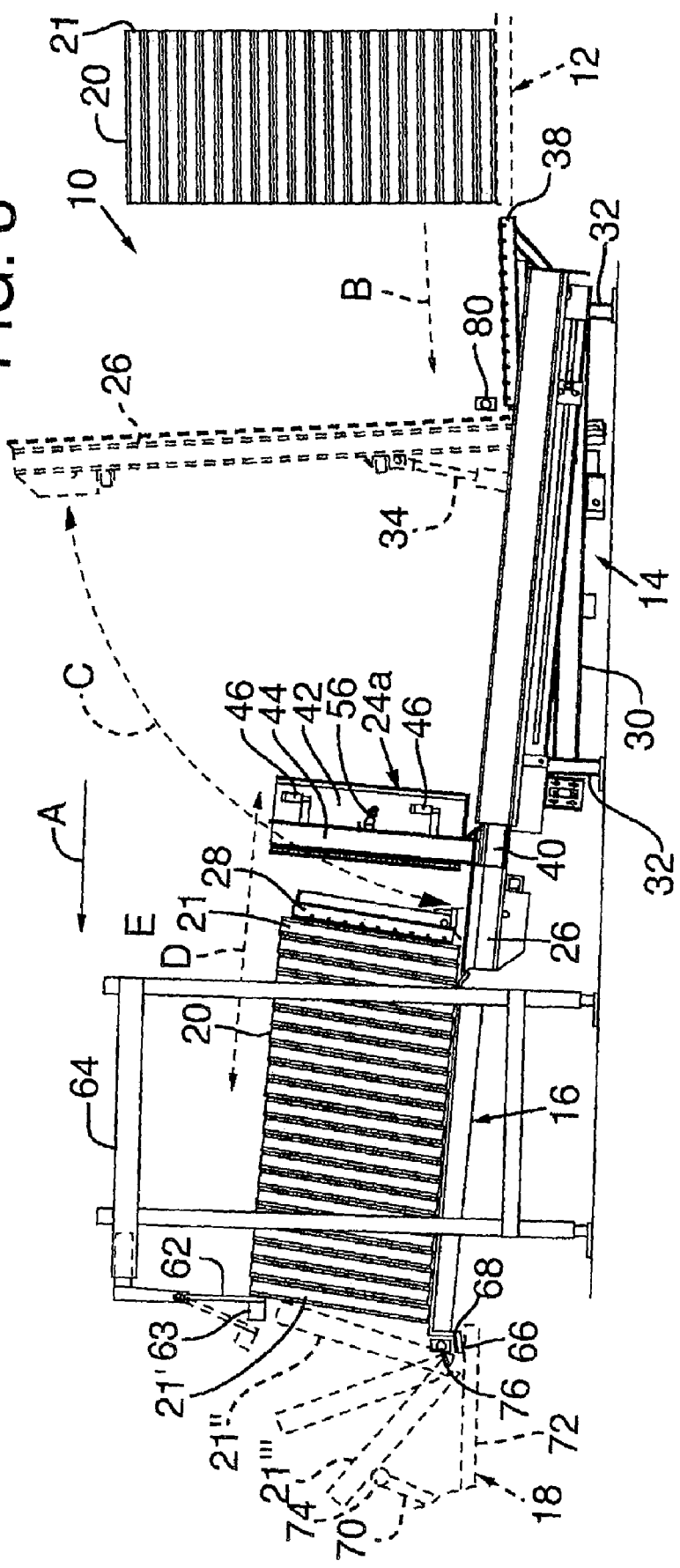

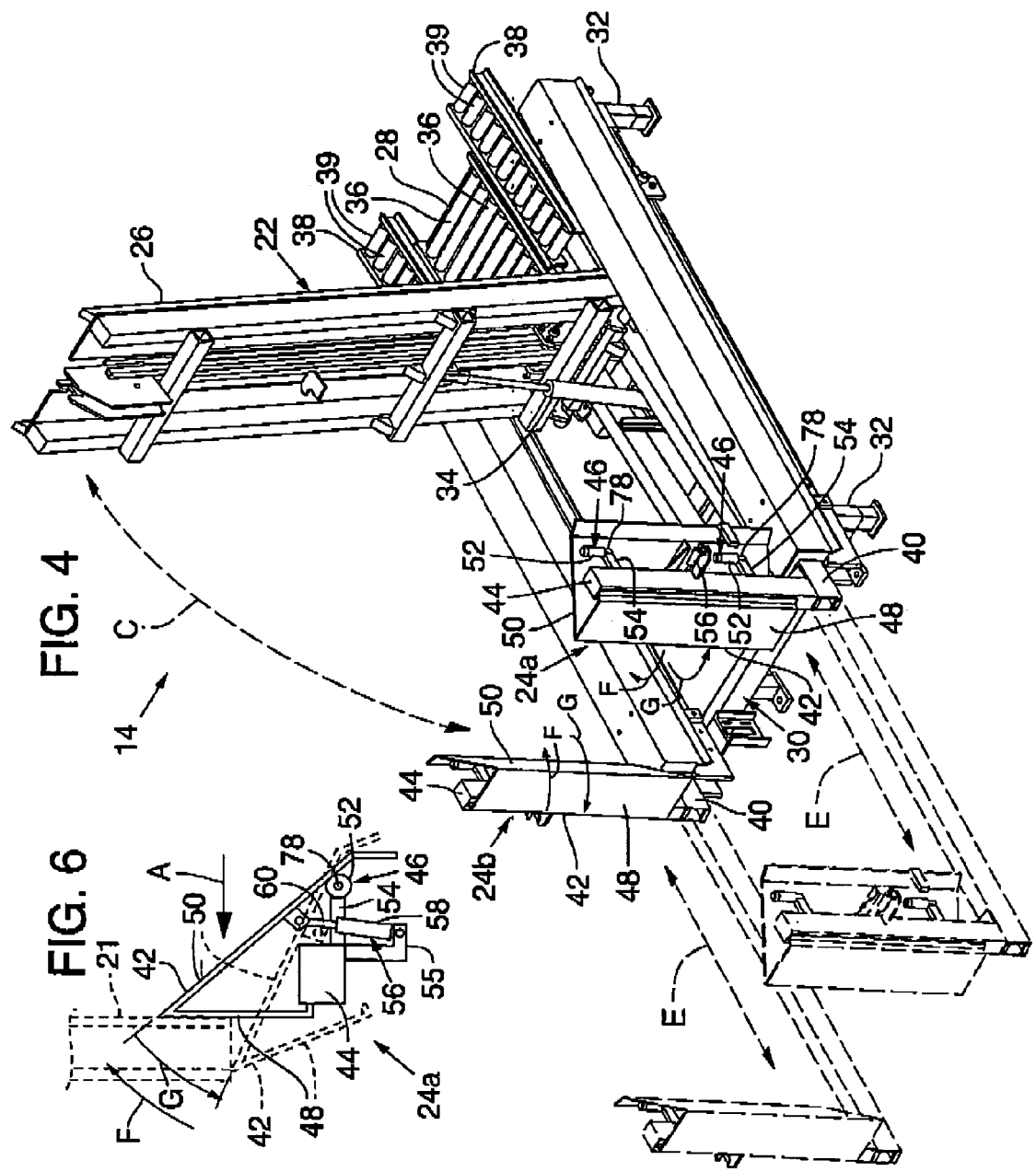

PALLET HANDLING APPARATUS AND METHOD

CROSS-REFERENCE TO RELATED APPLICATION

This application claims priority to U.S. Provisional Application No. 60/379,348, filed May 10, 2002.

FIELD

The present invention relates generally to an apparatus and method for handling a stack of pallets.

BACKGROUND

Pallets have been used for many years in connection with the storing, shipment, and handling of goods. Pallets are normally constructed of wood and are subject to damage because of the rough handling they receive. Therefore it is necessary to periodically inspect pallets so that damaged pallets can be segregated for repair or disposal.

Various systems have been developed to automate pallet-sorting operations and therefore keep sorting time to a minimum. Such automated sorting operations often utilize a so-called "up-ender," which typically comprises a substantially L-shaped member that is tiltable from an "up" position in which the long side of the member is upright and a "down" position in which the long side is horizontally disposed. An upright stack of pallets (i.e., a stack of horizontally oriented pallets, stacked on top of each other) to be sorted is received by the up-ender when it is in the up position. The up-ender is then pivoted downwardly approximately 90° to the down position to vertically orient the pallets (i.e., so that the pallets are supported on edge). In this position, pallets are individually removed from the end of the stack and sorted into acceptable, repairable, and nonrepairable pallet groups.

Another example of an automated pallet-handling apparatus is illustrated in U.S. Pat. No. 6,079,939, assigned to the assignee of the subject application. The apparatus of the '939 patent includes a mechanism for automatically indexing a stack of vertically oriented pallets along a conveyor. As a pallet reaches the end of the conveyor and after a pause sufficient to enable an operator to observe the exposed face of the pallet, the pallet is pushed off the conveyor onto a catch plate. The pallet's forward motion and the inclination of the catch plate causes the pallet to tilt forward onto an off-bearing conveyor, thereby exposing the opposite face of the pallet for inspection by the operator. The operator can then direct the pallet to the appropriate area (e.g., to an acceptable pallet stack, a repairable pallet stack, or a non-repairable pallet stack).

Despite the inventions discussed above, there exists a continuing need for new and improved systems for handling pallets.

SUMMARY

The present disclosure concerns an apparatus for handling pallets, such as for inspection and sorting. In an illustrated embodiment, an up-ender includes a support frame and a pallet-tilting mechanism coupled to the support frame in a pivotal manner to permit pivoting of the pallet-tilting mechanism between an up position and a down position. The pallet-tilting mechanism includes a short portion and a long portion, which are coupled together at right angles to form a substantially L-shaped structure. When the pallet-tilting mechanism is in the up position, the short portion is generally horizontally oriented to permit an upright stack of pallets to be loaded thereon. When pivoted to the down position, the stack is rotated about 90° so that the pallets become supported on edge on the long portion of the pallet-tilting mechanism. In addition, the pallet-tilting mechanism is adapted to displace the stack of vertically oriented pallets along the long portion when the pallet-tilting mechanism is in the down position. Also coupled to the support frame of the up-ender are first and second generally upright pusher arms, which are positioned to receive the stack of vertically oriented pallets from the pallet-tilting mechanism and further displace the pallets along a support surface.

In particular embodiments, an in-feed conveyor is positioned upstream of the up-ender and is adapted to automatically transfer an upright stack of pallets onto the short portion of the pallet-tilting mechanism when the pallet-tilting mechanism is in the up position. A pallet support table is positioned downstream of the up-ender and an off-bearing conveyor is positioned downstream of the pallet support table. The pusher arms index the pallets partially along the long portion of the pallet-tilting mechanism and the support table. As a pallet reaches the end of the support table and after a pause sufficient to enable an operator to inspect the exposed face of the pallet, the next index step causes the pallet to tilt forward and fall onto the off-bearing conveyor, exposing the opposite face of the pallet for inspection by the operator. Depending upon the observed condition of the pallet, the operator signals through controls the off-bearing conveyor and subsequent sorting conveyors to deliver the pallet to the desired location for further handling.

According to another representative embodiment, an up-ender includes a first pallet-moving mechanism configured to move a stack of pallets, with the pallets being generally vertically oriented, in a first direction over a support surface. A second pallet-moving mechanism of the up-ender is configured to receive the stack of pallets from the first pallet-moving mechanism and further move the stack of pallets in the first direction along the support surface.

In particular embodiments, the first pallet-moving mechanism is a pallet-tilting mechanism operable to tilt an upright stack of pallets onto its side so that the pallets are generally vertically oriented. The pallet-tilting mechanism includes a first member having an upper surface and a second member depending upwardly from the first member. The second member is movable longitudinally relative to the first member for pushing the stack of vertically oriented pallets in the first direction along the upper surface of the first member.

According to yet another representative embodiment, an up-ender for moving a stack of generally vertically oriented pallets along a support surface includes a pallet-moving device configured to move the stack of pallets along the support surface from a first position to a second, intermediate position. The up-ender also includes integral first and second generally upright pusher arms positioned on opposing sides of the support surface and supported for movement at or below a plane defined by the support surface. The pusher arms are configured to move the stack of pallets from the second position toward a third position, where, for example, the pallets are pushed onto an off-bearing conveyor.

The foregoing and other features and advantages of the invention will become more apparent from the following detailed description of several embodiments, which proceed with reference to the accompanying figures.

BRIEF DESCRIPTION OF THE DRAWINGS

FIG. 1 is a side view of a pallet sorting system according to one embodiment, showing a pallet-tilting mechanism of an up-ender in an up position with a pallet stack loaded thereon and a pair of pusher arms of the up-ender indexing pallets of another stack onto an off-bearing conveyor.

FIG. 2 is a side view of the pallet sorting system of FIG. 1, showing the pallet-tilting mechanism in a down position, displacing a pallet stack in the forward direction toward the pusher arms, as the pusher arms continue to index pallets onto the off-bearing conveyor.

FIG. 3 is a side view of the pallet sorting system of FIG. 1, showing the short portion of the pallet-tilting mechanism in a forward-most position and the pusher arms in a fully retracted position behind a pallet stack.

FIG. 4 is a perspective view of an up-ender according to one embodiment, showing the pallet-tilting mechanism in an up position.

FIG. 6 is a top plan view of one of the pusher arms of the up-ender of FIG. 4.

DETAILED DESCRIPTION

Figure 5:
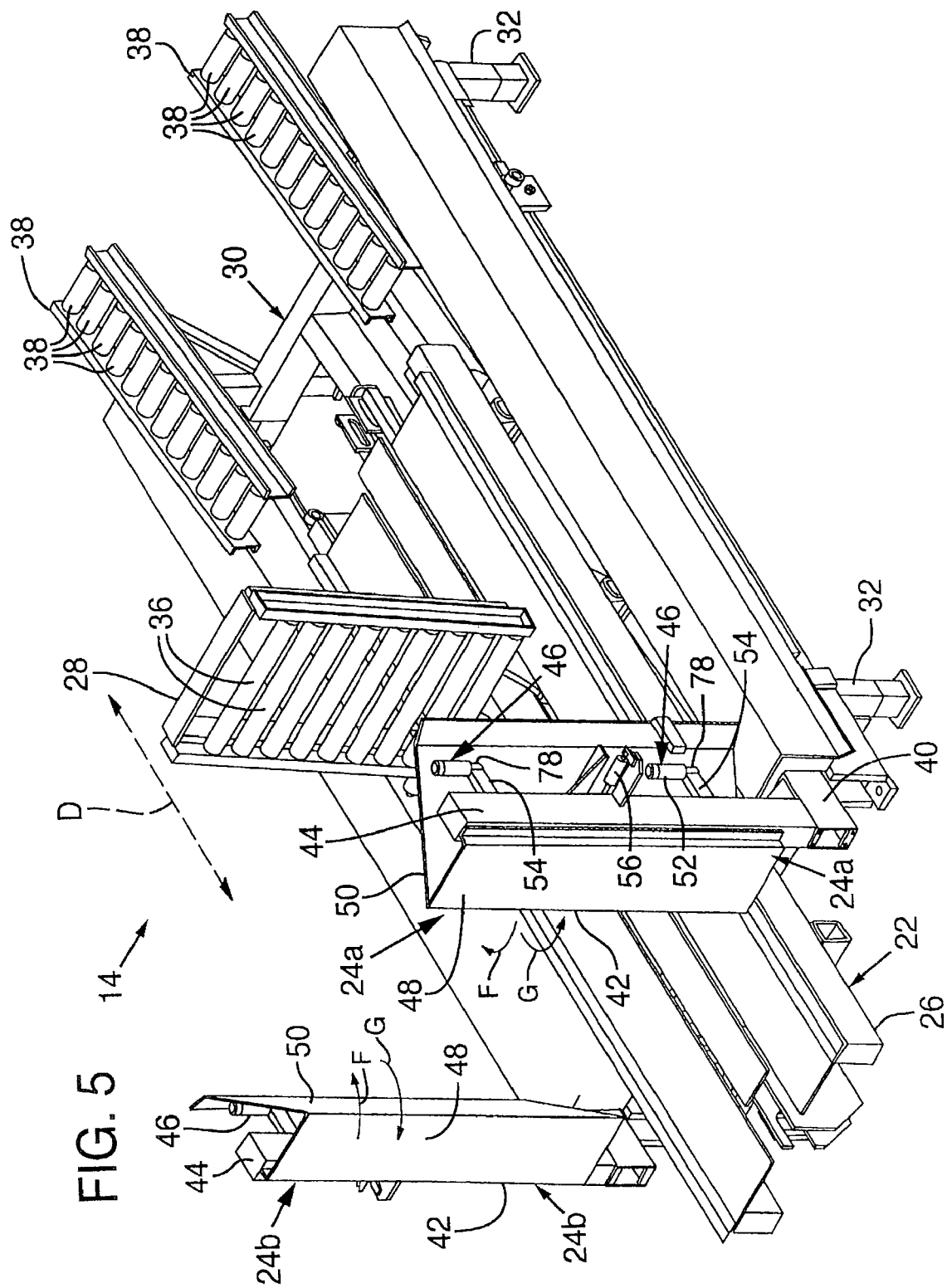
FIG. 5 is a perspective view of the up-ender of FIG. 4, showing the pallet-tilting mechanism in a down position.

The principles of this invention are particularly useful when embodied in a pallet sorting system, such as illustrated in FIGS. 1–3, and indicated generally at 10. Starting at the rightmost end of the pallet sorting system 10 and moving downstream, the sorting system 10 generally comprises an in-feed conveyor 12, an up-ender 14, a pallet support table 16, and an off-bearing conveyor 18. The upper surfaces of the in-feed conveyor 12, the up-ender 14, the pallet support table 16, and the off-bearing conveyor 18 define a support surface over which pallets travel as they move through the system 10.

The pallet sorting system 10 in the illustrated embodiment is configured for use with pallets having standardized dimensions (i.e., pallets having a length of about 48" in the direction of the stringers and a width of about 40" in the direction of the face boards). However, in alternative embodiments the pallet sorting system may be adapted for use with pallets having non-standard dimensions.

Arrow A depicted in FIGS. 1–3 indicates the general direction of travel of pallets through the sorting system 10. As used herein, the term "forward" refers to the direction indicated by arrow A and the term "rearward" refers to the opposite direction.

The in-feed conveyor 12 retains a plurality of stacks 20 of pallets 21 (one of which is shown in FIGS. 1–3) in position for transfer onto the up-ender 14. In one approach for sorting pallets, described below, each stack 20 has about 15–20 pallets 21, although stacks with greater or fewer pallets also can be used. As shown, the in-feed conveyor 12 supports pallet stacks 20 in an "upright" position. As used herein, an upright stack of pallets means a stack of horizontally oriented pallets stacked on top of each other. Although not shown in the drawings, the in-feed conveyor 12 may include a plurality of driven rollers to selectively move the stacks 20 onto the up-ender 14 (as indicated by arrow B in FIGS. 1–3), as generally known in the art.

Referring also to FIGS. 4 and 5, the illustrated up-ender 14 includes a support frame 30 having support legs 32, a pallet-tilting mechanism 22 coupled in a pivotal manner to the support frame 30, and integral first and second pusher arms 24a and 24b (also referred to herein as "pallet pushers") mounted for longitudinal movement on respective sides of the support frame 30. The pallet-tilting mechanism 22 and the pusher arms 24a, 24b are independently operable for moving separate pallet stacks 20 through the pallet sorting system 10. The operation of the up-ender 14 is described in greater detail below.

The pallet-tilting mechanism 22 in the illustrated configuration includes a long portion 26 and a short portion 28, which are coupled together generally at right angles to form a substantially L-shaped structure. The pallet-tilting mechanism 22 is pivotable between an "up" position for receiving an upright stack of pallets (FIGS. 1 and 4) and a "down" position (FIGS. 2, 3 and 5) for displacing a pallet stack, as indicated by double-headed arrow C in FIGS. 1–4. Any suitable drive mechanism may be used to raise and lower the pallet-tilting mechanism 22, such as the illustrated hydraulic cylinders 34 (FIGS. 1 and 4).

In the up position, the long portion 26 is vertically disposed and the short portion 28 is horizontally disposed to allow a pallet stack 20 to be displaced from the in-feed conveyor 12 onto the short portion 28 (as shown in FIG. 1). When the pallet-tilting mechanism 22 is lowered to the down position, the pallet stack 20 is tilted or rotated about 90° so that pallets in such stack become supported on edge on the long portion 26 (FIG. 2). In the down position, the long portion 26 is generally horizontal but is desirably inclined slightly upwardly at a small acute angle of about two to three degrees in the direction of movement of the pallets (arrow A) so that the pallets will tilt back slightly, as shown in FIGS. 1–3.

As shown in FIGS. 4 and 5, the short portion 28 of the pallet-tilting mechanism 22 may include a plurality of free-wheeling rollers 36. Mounted to the sides of the support frame 30 at the intake end of the up-ender 14 are conveyor tracks 38, each having a plurality of free-wheeling intake rollers 39. The conveyor tracks 38 are angled slightly downwardly in the direction of travel so tax a pallet stack 20 from the in-feed conveyor 12 will move under the force of gravity onto the short portion 28 (as best shown in FIGS. 1–3). In an alternative configuration, the conveyor tracks 38 are substantially horizontally disposed, in which case the intake rollers 39 desirably are driven rollers to facilitate the transfer of a pallet stack onto the up-aider 22.

The short portion 28 is configured to be movable longitudinally with respect to the long portion 26 (as indicated by double-headed arrow D in FIGS. 2, 3 and 5) by suitable drive mechanism, such as a drive chain (not shown). After the pallet-tilting mechanism 22 is pivoted to the down position, the short portion 28 automatically moves in the forward direction to displace a stack 20 of vertically oriented pallets 21 along the long portion 26 (FIG. 2). In this manner, the short portion 28 serves as a pallet-moving mechanism for longitudinally displacing a pallet stack 20, and the upper surface of the long portion 26 serves as a support surface for such pallet stack as it is displaced by the short portion 28. In the illustrated embodiment, the pallet stack 20 is displaced by the short portion 28 to a forward-most position, in which a few pallets in the stack are supported on the upper surface of the long portion 26 and the remaining pallets are supported on the upper surface of the pallet support table 16 (as shown in FIG. 3).

Other forms for the up-ender 14 also may be used. For example, the long portion 26 may be replaced with a similar structure having a substantially reduced length (e.g., a length equal to the length of the short portion 28). In the latter configuration, the up-ender 14 would be provided with a fixed support surface extending longitudinally between the long portion of the pallet-tilting mechanism 22 and the pallet support table 16 for supporting a pallet stack being displaced by the short portion 28.

In another modification to the up-ender 14 of the illustrated embodiment, the long portion 26 may include a conveyor mechanism, such as plural driven wheels, to displace a pallet stack in the forward direction. Such a conveyor mechanism could be used in lieu of or in addition to the short portion 28 for displacing a pallet stack.

The pusher arms 24a, 24b serve to receive a pallet stack 20 displaced by the short portion 28 of the pallet-tilting mechanism 22 and automatically index the pallets in such stack along the pallet support table 16 onto the off bearing conveyor 18. The term "index," as used herein, means to displace a pallet stack in small increments (e.g., a distance equal to the width of a pallet) with a delay between consecutive indexing steps sufficient to allow the last pallet in the stack to be inspected by an operator and individually removed or separated (either manually or automatically) from the stack.

As best shown in FIGS. 4 and 5, each pusher arm 24a, 24b in the illustrated configuration includes a door 42 connected in a pivotal manner to a generally upright support post 44. The lower ends of posts 44 are connected to respective longitudinally extending support members 40 mounted for longitudinal movement to the frame 30. The support members 40 are configured to be movable longitudinally with respect to the frame 30 between an extended position (shown in dashed lines in FIG. 4) and a retracted position (shown in solid lines in FIG. 4), as indicated by double-headed arrows E, by suitable drive mechanism for causing corresponding longitudinal movement of the pusher arms 24a, 24b. In a working embodiment, the support members 40 are driven by respective drive chains (not shown), which are in turn driven by a common drive shaft (not shown).

As best shown in FIG. 6, each door 42 of pusher arms 24a, 24b has a forward facing front plate 48 and a generally rearward facing back plate 50 extending at an acute angle from the inside edge of the front plate 48. Each post 44 supports a respective door 42 with upper and lower hinges 46 (FIGS. 4 and 5). Each hinge 46 in the illustrated configuration includes a pivot pin 78 disposed in an outer sleeve 52, which is connected in a suitable maimer (e.g., by welding) to an associated back plate 50. The bottom end of each pin 78 is connected to a respective lateral extension 54 depending from an associated post 44. In this manner, the doors 42 are swingable with respect to the posts 44 about respective vertical axes extending through the associated binges 46, as indicated by arrows F and G, between a "closed" position (shown in solid lines in FIG. 6) and an "open" position (shown in dashed lines in FIG. 6). As the pusher arms 24a, 24b push a pallet stack 20 in the forward direction, respective motion limiting members (not shown) on the pusher anus 24a; 24b prevent the doors 42 from swinging in the directions of arrows F beyond the "closed" position, in which the front plates 48 are aligned with each other in a common plane, against the weight of the pallet stack 20.

While the pusher arms 24a, 24b index the pallets in a stack 20 along the pallet support table 16 (FIG. 1), the pallet-tilting mechanism 22 receives another pallet stack 20 from the in-feed conveyor 12 (FIG. 1), pivots to the down position, and displaces the pallet stack toward the pusher arms 24a, 24b (FIG. 2). Thus, at one point of time, the short portion (which also pushes pallets) moves in an opposite direction to the pusher arms 24a, 24b. Thus, the upender has at least two pallet pushing mechanisms (e.g., the short portion 28 and the pusher arms 24a, 24b) that are separately controlled and move independently of one another. In a preferred method for operating the upender, movement of the pusher arms 24a, 24b and the pallet-tilting mechanism 22 is controlled such that a pallet stack 20 is in position behind the pusher arms 24a, 24b as the pusher arms 24a, 24b are indexing pallets onto the off-bearing conveyor 18 (FIG. 2).

When the leftmost pallet of the stack being displaced by the short portion 28 contact the back plates 50 of doors 42, the doors 42 are caused to swing away from each other in the direction of arrows G (FIG. 6), and the pusher arms 24a, 24b are automatically retracted in the rearward direction until the pusher arms 24a, 24b are retracted behind the pallets being displaced by short portion 28 (FIG. 3). As the pusher arms 24a, 24b are retracted, the short portion 28 begins to index pallets onto the off bearing conveyor 18. The short portion 28 continues to index pallets until it reaches its fully extended position, at which point the pusher arms 24a, 24b take over indexing the pallets for the short portion 28. The pusher arms 24a, 24b continue to index pallets until a succeeding pallet stack is loaded onto the pallet-tilting mechanism 22 and the short portion 28 again is in position to begin indexing pallets. Hence, there is a continuous feed of pallets through the pallet sorting system 10, with no waiting time between the indexing of the last pallet of one stack and the indexing of the first pallet of a succeeding stack.

Each pusher arm 24a, 24b desirably has a respective pneumatic cylinder assembly 56 fluidly connected to a pressurized fluid source (e.g., compressed air) for moving the doors 42 back to the closed position when the pusher arms 24a, 24b are fully retracted behind the next stack of pallets (FIG. 3). The cylinder assemblies 56 shown in the illustrated embodiment are conventional, with each having a cylinder 58 and a slidable piston 60 (FIG. 6). Each cylinder 58 is pivotally connected to an extension 55 of an associated post 44 and each piston 60 is pivotally connected to an associated door 42.

The operation of the cylinder assemblies 56 may be effected by means of conventional Reed switches (not shown), which operate upon the movement of respective magnets positioned on the pistons 60. Thus, when the leftmost pallet of a stack being displaced by the short portion 28 impacts the back plates 50 of the doors 42, causing movement of the pistons 60, the initial movement of the pistons 60 upon impact causes movement of the magnets, which in turn causes some air to bleed from the cylinders 58, thereby reducing the pressure in the cylinders 58 and allowing the doors 42 to swing open. When the pusher arms 24a, 24b are fully retracted behind the rightmost pallet in the stack, the initial pressure in the cylinders 58 is re-established, causing the doors 42 to swing back to the closed position in the directions of arrows F under the biasing force of cylinder assemblies 56.

Pallet-moving mechanisms other than the illustrated pusher arms 24a, 24b also may be used for indexing pallets. For example, the pusher arms 24a, 24b may be replaced with a single upright pushing mechanism, which can, for example, be adapted to pivot downwardly below the support surface to allow the pushing mechanism to be retracted in the rearward direction behind the next stack of pallets to be indexed by the pushing mechanism. In another embodiment, a pop-up type conveyor can be substituted for the pusher arms 24a, 24b.

As shown in FIGS. 1 and 2, a free-swinging pallet restraining arm 62 is pivotally suspended from an overhead support structure 64 above the leftmost or discharge end of the pallet support table 16. The restraining arm 62 carries a counterweight 63 and is positioned so as to engage the exposed face of an end pallet 21' and prevent accidental forward tilting of the end pallet 21' when such pallet reaches the discharge end of the pallet support table 16. The overhead support structure 64 can be integral with the pallet support table 16 as shown in the illustrated embodiment, or alternatively, the overhead support structure 64 can be a free-standing unit separate from the pallet support table 16.

The discharge end of the pallet support table 16 includes a catch plate 66 having one or more cushion bars 68, made of rubber or other resilient material, mounted on the catch plate 66 and upon which a pallet 21" may land without injury and a minimum of noise as it slides off the pallet support table 16. The restraining arm 62 is of such length that the pallet 21", when it lands upon cushion bars 68, will be entirely beneath the lower end of the restraining arm 62. Because of the forward momentum impacted to the discharging pallet 21" and the inclination of the cushion bars 68, as the pallet 21" lands upon the cushion bars 68, the pallet will tend to tilt forwardly onto the off-bearing conveyor 18. In a working embodiment, the catch plate 66 and the upper surfaces of the cushion bars 68 are inclined downwardly at an angle of about 10° to the horizontal.

The off-bearing conveyor 18 is positioned adjacent the catch plate 66 for receiving and carrying off pallets to be sorted into designated areas. The illustrated off-bearing conveyor 18 includes a cushion arm 70 mounted in a pivotal manner to a generally horizontal bed 72. The cushion arm 70 serves to minimize injury to the tilting pallet, indicated at 21'", and to reduce noise as the pallet 21'" falls onto the bed 72. The cushion arm 70 is configured to extend above the upper surface of the bed 72 so as to engage the pallet 21'" when it is at an angle of about 30° to the horizontal, as shown in FIGS. 1 and 2. The cushion bar 70 includes cushion bars 74, made of rubber or other resilient material, extending horizontally from the upper end thereof for supporting pallet 21'" (the cushion bars 74 extend perpendicularly to the plane of the page when viewing FIGS. 1 and 2). The cushion arm 70 is adapted to be pivoted downwardly to lower pallet 21'" onto the upper surface of the bed 72. In particular embodiments, for example, a pneumatic cylinder (not shown) is operatively connected to the cushion arm 70 and the bed 72, from which air is bled to cause the cushion arm 70 to pivot downwardly and lower pallet 21'" onto the bed 72.

The bed 72 of the off-bearing conveyor 18 may include a plurality of driven rollers (not shown) for carrying off pallets lowered onto the bed 72 by the cushion arm 70 to designated areas. Reference is made to U.S. Pat. No. 6,079,939, assigned to the assignee of the present application and incorporated herein by reference, which describes in greater detail an off-bearing conveyor of the type shown in the present disclosure.

In one approach for sorting pallets, an operator is stationed at the discharge end of the pallet support table 16 for inspecting pallets as they are indexed off the pallet support table 16. The pallets are indexed at a rate to allow the operator to first observe the exposed face of the leading pallet 21' on the pallet support table 16, and as such pallet falls forward onto the cushion arm 70 and is lowered onto the bed 72 to observe the other, now upper, face of the pallet. By way of any suitable control system, the operator can direct the operation downstream of the inspection station so that pallets are directed to designated areas according to their condition (e.g., rejected pallets, repairable pallets or undamaged pallets).

Any of various suitable detecting and control systems can be used to achieve automatic control of the in-feed conveyor 12, the pallet-tilting mechanism 22, the pusher arms 24a; 24b and the cushion arm 70. In the illustrated embodiment, for example, when the pallet-tilting mechanism 22 is pivoted to the up position, a limit switch (not shown) is activated, which causes the in-feed conveyor 12 to automatically transfer a pallet stack 20 onto the pallet-tilting mechanism 22. A photoelectric eye detector, indicated at 80 (FIGS. 2 and 3), is spaced forwardly of the intake end of the up-ender 14 so that when a pallet stack is transferred onto the pallet-tilting mechanism 22, the pallet-tilting mechanism 22 is caused to automatically pivot to the down position. A second limit switch (not shown) senses that the pallet-tilting mechanism is in the down position and causes the abort portion 28 to begin displacing the pallet stack in the forward direction.

In an exemplary method for operating the upender 14, the short portion is used as a "primary" indexer for indexing pallets onto the off bearing conveyor. The pusher arms 24a, 24b are used as a "secondary" indexer for taking over indexing for the short portion 28 while the pallet-tilting mechanism 22 retrieves another stack of pallets from the in-feed conveyor 12. In this manner, pallets are continuously indexed onto the off bearing conveyor, without any time delay between the indexing step of the last pallet of one stack and the first pallet of a succeeding stack.

To control indexing of the pallets (either by the short portion 28 or the pusher arms 24a, 24b), a second photoelectric eye detector, indicated at 76 (FIGS. 1–3), is positioned just above cushion bars 68. As a pallet falls onto the cushion bars 68, the movement of the drive chains (not shown) driving the short portion 28 (or the pusher arms when they are being used to index pallets) is momentarily arrested so only the leading (leftmost) pallet is offloaded. Automatic lowering of the cushion arm 70 may be accomplished with a conventional reed switch (not shown) positioned on the pneumatic cylinder of the cushion arm, which operates upon movement of a magnet positioned on the piston of such cylinder. When the piston moves slightly upon the impact of pallet 21'" falling onto the cushion arm 70, the reed switch operates to cause air to be bled from the cylinder, thereby lowering the cushion arm. A third photoelectric eye (not shown) positioned downstream of the off-bearing conveyor 18, operates to trigger another indexing movement of the short portion and raising of the cushion arm 70 as an inspected pallet clears the cushion arm and interrupts the third photoelectric eye. This is repeated until the short portion 28 reaches its fully extended position, at which point a third limit switch (not shown) is activated to cause the pusher arms 24a, 24b to begin indexing the pallets onto the off-bearing conveyor 18.

A fourth limit switch (not shown) is positioned proximate the in-take end of the pallet support table 16 to sense when the last (rightmost) pallet in the stack has been pushed from the long portion 26 of the pallet-tilting mechanism 22 onto the pallet support table 16 by the pusher arms 24a, 24b. The fourth limit switch operates to cause the short portion 28 to retract and the pallet-tilting mechanism 22 to pivot to the up position for receiving a succeeding pallet stack from the in-feed conveyor 12. When the succeeding stack is loaded onto the pallet-tilting mechanism 22, the pallet-tilting mechanism 22 is lowered and the short portion 28 is moved in the forward direction until the first (leftmost) pallet impacts the doors 42 of the pusher arms 24a, 24b.

At this point, the short portion 28 resumes indexing the pallets and the doors 42 swing open, as described above, and the pusher arms 24*a*, 24*b* are retraced. The pusher arms 24*a*, 24*b* remain idle until the short portion 28 reaches its fully extended position, at which point the pusher arms 24*a*, 24*b* begin indexing pallets.

It should be understood that other methods for handling pallets can be implemented with the system shown in FIGS. 1–3. For example, in an alternative method, only the pusher arms 24*a*, 24*b* are used to index pallets onto the off bearing conveyor 18. In this method, the short portion 28 is only used to displace a stack of pallets to a forward position where the stack is received by the pusher arms 24*a*, 24*b* for indexing.

In alternative embodiments, the up-ender 14 and the pallet support table 16 can be formed as an integral structure, with the pallet support table extending from the discharge end of the up-ender. In other embodiments, the system 10 may be adapted to allow an operator to manually remove individual pallets from the discharge end of the pallet support table 16 for sorting.

The present invention has been shown in the described embodiments for illustrative purposes only. The present invention may be subject to many modifications and changes without departing from the spirit or essential characteristics thereof. We therefore claim as our invention all such modifications as come within the scope of the following claims.

We claim:

1. An up-ender for use in handling pallets, comprising:
   a first pallet-moving mechanism configured to move a stack of pallets, with the pallets being generally vertically oriented, in a first direction over a support surface; and
   a second pallet-moving mechanism comprising first and second generally upright pusher arms, the second pallet-moving mechanism being integral with the first pallet-moving mechanism and being operable for translational movement independent of the first pallet-moving mechanism, the second pallet-moving mechanism being positioned to receive pallets displaced by the first pallet-moving mechanism and further move said displaced pallets in the first direction over the support surface,
   wherein the pusher arms are carried by respective first and second longitudinally extending support members, the support members being movable longitudinally in the first direction and a second direction, opposite the first direction, for causing movement of the pusher arms in the first and second directions,
   wherein each pusher arm includes a door that is swingable about a generally vertical axis between a first position for pushing pallets in the first direction and a second position for allowing movement of the pusher arms in the second direction relative to the pallets.

2. The up-ender of claim 1, wherein the first pallet-moving mechanism is configured to receive the stack of pallets, with the pallets being generally horizontally oriented and re-position the stack so that the pallets are generally vertically oriented for being moved by the first pallet-moving mechanism in the first direction.

3. The up-ender of claim 1, wherein the first pallet-moving mechanism comprises a first member having an upper surface and a second member depending upwardly from the first member and being movable longitudinally relative to the first member for pushing the stack of pallets in the first direction along the upper surface of the first member.

4. The up-ender of claim 3, wherein the first pallet-moving mechanism is pivotable between a pallet-receiving position and a pallet-moving position, wherein when the first pallet-moving mechanism is in the pallet-receiving position, the second member is generally horizontally oriented for receiving a stack of generally horizontally oriented pallets, and wherein when the first pallet-moving mechanism is pivoted from the pallet-receiving position to the pallet-moving position, the pallets become generally vertically oriented for movement in the first direction along the upper surface of the first member.

5. The up-ender of claim 1, wherein each pusher arm is supported for movement in the first direction at a position at or below a plane defined by the support surface.

6. The up-ender of claim 1, wherein each pusher arm is coupled at a lower end portion thereof to a respective support member.

7. The up-ender of claim 1, wherein each pusher arm includes a generally upright post connected to a respective support member, each post supporting one of said doors.

* * * * *

UNITED STATES PATENT AND TRADEMARK OFFICE
CERTIFICATE OF CORRECTION

| | | |
|---|---|---|
| PATENT NO. | : 7,150,598 B2 | Page 1 of 1 |
| APPLICATION NO. | : 10/321266 | |
| DATED | : December 19, 2006 | |
| INVENTOR(S) | : John S. Smets and Robert D. Smets | |

It is certified that error appears in the above-identified patent and that said Letters Patent is hereby corrected as shown below:

Column 4, line 37, "so tax a pallet" should be --so that a pallet--.

Column 5, line 49, "binges" should be --hinges--.

Signed and Sealed this

Seventh Day of August, 2007

JON W. DUDAS
*Director of the United States Patent and Trademark Office*